(12) United States Patent
Davis et al.

(10) Patent No.: US 10,122,171 B2
(45) Date of Patent: Nov. 6, 2018

(54) WIRELESS POWER CONTROL AND METRICS

(71) Applicant: Kortek Industries Pty Ltd, Brisbane (AU)

(72) Inventors: Benjamin Davis, Alderley (AU); Barrie Davis, Sanctuary Cove (AU)

(73) Assignee: Kortek Industries Pty Ltd, Brisbane (AU)

( * ) Notice: Subject to any disclaimer, the term of this patent is extended or adjusted under 35 U.S.C. 154(b) by 167 days.

(21) Appl. No.: 14/894,370

(22) PCT Filed: Oct. 8, 2013

(86) PCT No.: PCT/AU2013/001157
§ 371 (c)(1),
(2) Date: Nov. 27, 2015

(87) PCT Pub. No.: WO2014/190370
PCT Pub. Date: Dec. 4, 2014

(65) Prior Publication Data
US 2016/0118793 A1 Apr. 28, 2016

(30) Foreign Application Priority Data
May 31, 2013 (AU) .............................. 2013901969

(51) Int. Cl.
| | |
|---|---|
| G06F 19/00 | (2018.01) |
| H02J 3/14 | (2006.01) |
| H04W 4/60 | (2018.01) |
| H04L 12/28 | (2006.01) |
| G05B 15/02 | (2006.01) |
| H04B 3/54 | (2006.01) |
| H04L 29/12 | (2006.01) |
| H04L 29/08 | (2006.01) |
| H05B 37/02 | (2006.01) |
| H04W 84/12 | (2009.01) |

(52) U.S. Cl.
CPC ................ *H02J 3/14* (2013.01); *G05B 15/02* (2013.01); *H04B 3/54* (2013.01); *H04L 12/282* (2013.01); *H04L 61/6081* (2013.01); *H04L 67/104* (2013.01); *H04W 4/60* (2018.02); *H04W 84/12* (2013.01); *H05B 37/0272* (2013.01); *Y02B 70/325* (2013.01); *Y04S 20/228* (2013.01)

(58) Field of Classification Search
CPC ............ G05F 1/66; F24F 11/0012; H02J 3/14
USPC ....................................................... 700/278
See application file for complete search history.

(56) References Cited

U.S. PATENT DOCUMENTS

| | | |
|---|---|---|
| 2009/0215404 A1 | 8/2009 | Kesavan et al. |
| 2010/0332373 A1 | 12/2010 | Crabtree et al. |
| 2011/0046792 A1* | 2/2011 | Imes ............... H04L 67/42 700/278 |
| 2011/0202189 A1 | 8/2011 | Venkatakrishnan et al. |
| 2011/0202190 A1 | 8/2011 | Venkatakrishnan et al. |

(Continued)

FOREIGN PATENT DOCUMENTS

WO 2013052685 4/2013

*Primary Examiner* — Michael D Masinick
(74) *Attorney, Agent, or Firm* — Martin IP Pty Ltd

(57) ABSTRACT

A system and method for reducing load across a portion of a power grid. The system (400) includes an access manager device (200) that forms part of a local power management network (600) and is configured for communication with a smartphone (10) and a smartmeter (300).

6 Claims, 7 Drawing Sheets

(56) References Cited

U.S. PATENT DOCUMENTS

| | | |
|---|---|---|
| 2011/0202194 A1 | 8/2011 | Kobraei et al. |
| 2011/0202198 A1 | 8/2011 | Venkatakrishnan et al. |
| 2011/0202293 A1 | 8/2011 | Kobraei et al. |
| 2011/0202783 A1 | 8/2011 | Venkatakrishnan et al. |
| 2011/0202910 A1 | 8/2011 | Venkatakrishnan et al. |
| 2013/0083805 A1 | 4/2013 | Lu et al. |
| 2013/0085620 A1* | 4/2013 | Lu ................ H04L 12/2807 700/286 |
| 2013/0346768 A1* | 12/2013 | Forbes, Jr. ............ G06F 1/266 713/310 |
| 2014/0191573 A1 | 7/2014 | Chen et al. |
| 2014/0244063 A1 | 8/2014 | Davis et al. |

* cited by examiner

WIRELESS POWER CONTROL AND METRICS

FIELD OF THE INVENTION

The present invention relates to the analysis of power metrics and control of mains power in domestic and commercial applications using standard smartphones, tablets, notebooks, laptops, netbooks, ultrabook computers and similar items to act as a communication interface for dynamic power management notifications, messaging and data analysis as well as a human interface for an electricity management unit through an adaptable wireless communications link.

BACKGROUND OF INVENTION

Power meters are a common part of domestic and commercial buildings. In recent years, there has been significant growth in technology used to measure and control mains power through the implementation of devices known as smartmeters. Smartmeters typically incorporate real-time or near real-time sensors that record the consumption of electricity and transfer this data remotely for monitoring and billing purposes. Smart metering is able to provide detailed metrics over time, allowing utilities to charge tiered tariffs linked to instantaneous demand and associated generation costs. Due to more granular measurement capabilities, utilities are moving to augment smartmeters with control features that can shed load during peak periods in order to limit peak demand and consequently lower plant and capital costs. Any mechanism used to reduce demand during peak periods is typically referred to as demand response, that definition being adopted herein.

In recent years, the proliferation of smartphones has placed powerful computing devices in the hands of the public. While these devices can generate and transmit wireless commands, their generic wireless systems are not compatible with the standards currently used in domestic or commercial smartmeters, so they cannot natively communicate with such devices in order to exchange information or commands.

SUMMARY

In one preferred embodiment, the present invention includes three parts: an access administrator with a wireless communications module operable for wireless communication with a personal controller, a local network communications module operable for communication with an electricity management unit, and an interface connection adapted to receive power from an electricity management unit; a battery powered personal controller able to communicate with an access administrator via a wireless communications link; and a service platform capable of exchanging data with a personal controller. It will be appreciated that reference herein to "preferred" or "preferably" is intended as exemplary only.

The access administrator is preferably configured to wirelessly operate: as an adaptable Wi-Fi Direct and network Wi-Fi device, either individually or concurrently, using Wi-Fi-Direct and/or network Wi-Fi technologies; and optionally as a Bluetooth® device using Bluetooth® SIG class 2.1+EDR or later technologies including Bluetooth® Low Energy. As used herein, "network Wi-Fi" refers to the Wi-Fi Alliance definition as any "wireless local area network (WLAN) products that are based on the Institute of Electrical and Electronic Engineers (IEEE) 802.11 standards" including any amendments, extensions or proprietary implementations. As used herein, the term "Wi-Fi Direct" refers to a device configured to support the Wi-Fi Alliance Wi-Fi Direct specification and amendments, extensions or any proprietary implementations of Wi-Fi peer-to-peer technology.

Wi-Fi Direct and Bluetooth® are peer-to-peer capable communication technologies. Peer-to-peer communication methods and control aspects that may be incorporated into the access administrator are described in more detail in PCT Application No. PCT/AU2011/001666, filed Dec. 29, 2011, titled "Wireless Power, Light and Automation Control," the entire disclosure of which is incorporated herein by reference. Network Wi-Fi is a communication technology that allows devices to communicate through a WLAN. Adaptable network, peer-to-peer communication methods and system attributes that may be incorporated into the access administrator are described in more detail in PCT Application No. PCT/AU2012/000959, filed Aug. 15, 2012, titled "Adaptable Wireless Power, Light and Automation System" the entire disclosure of which is incorporated herein by reference.

The access administrator preferably includes a physical interface designed to accept mains level power from, and exchange data with, an electricity management unit. The access administrator and electricity management unit preferably communicate by way of power line communications and include the necessary capabilities for impressing a modulated carrier signal onto mains power wiring. The supported power line communications may be by way of any protocol that facilitates communication between an access administrator and electricity management unit using mains power wiring. In one preferred embodiment, power line communications may incorporate: the HomePlug Powerline Appliance Homeplug standards and/or specifications; IEEE 1901, 1901.1 and/or 1901.2 standards and/or specifications; and/or ITU-T's G.hn standards and/or specifications; including any amendments, extensions, revisions or proprietary implementations. Other suitable standards and/or specifications may include, but are not limited to, those from the Universal Powerline Association, SiConnect, the HD-PLC Alliance, Xsilon and Powerline Intelligent Metering Evolution Alliance.

In one preferred embodiment, in addition to, or instead of, power line communications, the access administrator may preferably include the necessary hardware to support wireless communication with an electricity management unit via any suitable personal area network (PAN) or home area network (HAN) wireless technologies, protocols and/or standards configurable for use in the utility industry including any Zigbee® protocol or standard published by the Zigbee® Alliance; any protocol or standard published by the WI-SUN Alliance; and/or any protocol or standard based on IEEE 802.15 including, but not limited to, IEEE 802.15.4. Unless otherwise noted, the wireless local network communications capabilities will be described in terms of Zigbee®, though the invention is not so limited.

The personal controller is preferably a commercially available cellular or mobile phone commonly known as a smartphone that supports at least network Wi-Fi and may also support Wi-Fi Direct and/or Bluetooth® and/or Near Field Communications (NFC). Unless otherwise noted, the personal controller will be described in terms of a smartphone, though the invention is not so limited. For example only, the personal controller may be any computing device which can download or install by other means an Applications Program (App), have a suitable interface the user can interact with to control the App in order to execute required functions, have the wireless communications capability to establish a communications link with an access administrator, and have the communications capability to exchange data with a service platform. Examples of personal controllers include smartphones, tablets, laptops, ultrabooks and notebook personal computers.

The access administrator can preferably form a communications link with a smartphone using Wi-Fi Direct and/or network Wi-Fi. It can be appreciated that when the access administrator is connected to a WLAN, a smartphone with Wi-Fi capability also connected to the same WLAN can use an appropriate App to communicate with the access administrator. That is, a user can enter a command into their smartphone and send it to the access administrator via the WLAN. In this case the smartphone could be in the vicinity of the WLAN access point, or the smartphone could be at a remote location and communicate with the WLAN access point via the Internet if so configured.

It can be appreciated that an access administrator operating in a Wi-Fi Direct mode can communicate peer-to-peer with a smartphone without the requirement of a WLAN. In this case, the access administrator preferably simulates a Wi-Fi access point or operates as a software access point (softAP) if the smartphone is not using Wi-Fi Direct to communicate; or if the smartphone is using Wi-Fi Direct to communicate, the access administrator and smartphone can preferably negotiate which device assumes the Wi-Fi Direct group owner role and establish a peer-to-peer connection. Once a peer-to-peer connection has been established, the user is able to send commands directly from a smartphone to the selected access administrator without the need for any other intermediary or network.

The present invention in one preferred embodiment provides an access administrator with wireless communication capabilities derived from any number of radios, transceivers and controllers that provide both a network Wi-Fi and Wi-Fi Direct connection individually or concurrently. In some preferred embodiments, the access administrator may also include the necessary radios, transceivers or components to support a wireless Bluetooth® connection. In some preferred embodiments, the access administrator may also include the necessary radios, transceivers or components to support a wireless Zigbee® connection.

Depending on cost and desired outcome, the wireless communication capabilities of the access administrator may be achieved by using: any number of discrete radios, aerials, transceivers, microprocessors and controllers either individually, collectively, or as a system in a package (SiP) or as a system on a chip (SoC); a combination or "combo" chip that aggregates the functionality of a number of discrete transceivers and controllers of different standards as a SiP or SoC; or using any combination of combo chip(s), SiP(s), SoC(s) and/or discrete radios, aerials, transceivers and controllers. The access administrator may utilize single or multiple wireless bands, physical channels, virtual channels, modes or other coexistence technologies and algorithms, the methods of which are familiar to those of ordinary skill in the art and for simplicity are not described herein. Depending on the chosen hardware components, the access administrator may also include shared antenna support and shared signal receiving paths to eliminate the need for an external splitter or reduce the number of aerials required.

The present invention in one preferred embodiment provides an access administrator with adaptable wireless communications that in a first mode provides a Wi-Fi Direct peer-to-peer connection and in a second mode can be configured by the user to operate as a network Wi-Fi device and connect to a WLAN as a client.

The access administrator preferably has its wireless communications set to initially function in Wi-Fi Direct mode irrespective of its final configuration. Because the Wi-Fi Direct mode is a peer-to-peer connection, as soon as power is applied to the access administrator, it can be recognised by a smartphone running at least network Wi-Fi and a wireless communications link can be established. Once the link is established, the user is able to activate a smartphone App which preferably uses the data path between the smartphone and access administrator. Using a smartphone App, the user can choose if the access administrator is to continue running in Wi-Fi Direct mode, swap to network Wi-Fi mode, or run both modes concurrently where supported, and set the access administrator with any operational parameters required for a network Wi-Fi or Wi-Fi Direct device, name the device, set an encryption key, enter a password and any other requirements. When this procedure has been completed, the user can command the access administrator to "restart", at which time it will configure itself according to the parameters which have been specified during the setup process.

If the user has chosen the access administrator to operate in Wi-Fi Direct mode, it would continue to do so after the restart. The access administrator would only connect to smartphones that can fully comply with its connection requirements before establishing a communications link. This may include security measures in addition to any native security measures of Wi-Fi Direct such as Wi-Fi Protected Access or Wi-Fi Protected Access 2.

If the user has chosen the access administrator to operate in a network Wi-Fi mode, the smartphone App would configure the necessary parameters for the access administrator to connect to a WLAN. When the access administrator restarts, it would connect as a client device on the WLAN. It would then preferably be accessible to devices which are also connected to the same WLAN. A peer-to-peer wireless mode of the access administrator is preferably used to configure the necessary parameters for the access administrator to connect to a WLAN as a client.

In either mode, a smartphone App is preferably used to control the functional capabilities of the access administrator. In network Wi-Fi mode, the smartphone App communicates with the selected access administrator via a WLAN access point. In Wi-Fi Direct mode, the smartphone App communicates directly with the selected access administrator peer-to-peer.

If the user has chosen the access administrator to operate in both Wi-Fi Direct mode and network Wi-Fi mode concurrently, when the access administrator restarts it would appear as a client device on the WLAN and as a Wi-Fi Direct access point/group participant with the functionality of each mode being available. In that way, and as an example only, an access administrator could allow third party access via a Wi-Fi Direct connection without allowing access to the concurrent WLAN connection, thus preventing access to other WLAN devices.

In one preferred embodiment, a Bluetooth® peer-to-peer connection between a smartphone and access administrator may be used to enter information for configuration of the access administrator as a network Wi-Fi device and/or Wi-Fi Direct access point/group participant, or to facilitate the establishment of a network Wi-Fi or Wi-Fi Direct connection. In another preferred embodiment, a Bluetooth® connection with a smartphone may be used as a peer-to-peer communication channel to exchange data with the access administrator.

The service platform is preferably an applications service platform or software as a service platform that utilizes a computer(s), computing device(s) or server(s) capable of processing data and/or analyzing data and/or compiling data and/or exchanging data and/or transferring data and/or receiving data and/or storing data and/or manipulating data in any necessary way and can communicate with at least a personal controller and preferably the App used to control the functional capabilities of an access administrator and/or an electricity management unit.

In a first preferred aspect, the present invention is directed to a device for linking a personal controller to an electricity management unit, the personal controller having a processor, a user interface, and a wireless communications transceiver, the electricity management unit being configured to at least measure power flow. The device comprises a wireless communications module operable for wireless communication with the personal controller, the wireless communications module including an aerial and a radio transceiver, the wireless communications module being configured to communicate with the personal controller selectively using a non-peer-to-peer communication link and at least one of two different peer-to-peer communications links. The device further comprises a local network communications module operable for communication with the electricity management unit, the local network communications module being configured to communicate with the electricity management unit selectively using a wired communications mode and a wireless communications mode. The device further comprises a microcontroller configured to access, through the local network communications module, the electricity management unit based at least in part on instructions communicated from the personal controller through the wireless communications module, the microcontroller being configured to operate the wireless communications module in more than one mode, the microcontroller being configured to operate the wireless communications module in a first mode using one of the peer-to-peer communications links, the microcontroller being configured to operate the wireless control module in a second mode using the non-peer-to-peer communications link.

In another preferred aspect, the present invention is directed to a system for dynamically reducing load across a power grid. The system comprises a service platform including a processor and data storage means. The system further comprises a plurality of local power management networks, each local power management network including an access administrator device and at least one power control unit, the access administrator device having a wireless communications module configured to communicate with a personal controller selectively using at least one peer-to-peer communications standard and a non-peer-to-peer communication standard, and a local network communications module configured to communicate with a smartmeter and at least one of the power control units, the at least one power control unit having a communications control module configured to receive communications from the access administrator device to vary power from a mains power channel to an electrical device or system, the wireless communications module being configure to communicate with the service platform through a communications network.

In a further preferred aspect, the present invention is directed to a device for linking a personal controller to a smartmeter, the personal controller having a processor, a user interface, and a wireless communications transceiver, the smartmeter being configured to at least measure power flow. The device comprises a wireless communications module operable for wireless communication with the personal controller, the wireless communications module including an aerial and a radio transceiver, the wireless communications module being configured to communicate with the personal controller selectively using at least one peer-to-peer communications standard and a non-peer-to-peer communication standard. The device further comprises a local network communications module operable for communication with the smartmeter, the local network communications module being configured to communicate with the smartmeter selectively using a wired communications link and a wireless communications link. The device further comprises a microcontroller configured to access, through the local network communications module, the smartmeter based at least in part on instructions communicated from the personal controller through the wireless communications module.

In an additional preferred aspect, the present invention is directed to a method for accessing, with a personal controller, an electricity management unit to at least measure power flow. The method comprises receiving, at an access administrator device at or near an electricity management unit, a command from the personal controller to access the electricity management unit, the command being received by the access administrator device using a first communications standard; sending a command, with the access administrator device, to the electricity management unit to provide power measurement data to the access administrator device, the command being sent by the access administrator device using a second communications standard different from the first communications standard; and relaying, with the access administrator device, the requested data from the electricity management unit to the personal controller.

In an additional preferred aspect, the present invention is directed to a local power management network for dynamically reducing a portion of a load across a power grid. The network comprises at least one power control unit. The network further comprises an access administrator device, the access administrator device having a wireless communications module, the wireless communications module being configured to communicate with a smartphone selectively using at least one peer-to-peer communications standard and a non-peer-to-peer communication standard, and a local network communications module configured to communicate with a smartmeter and at least one of the power control units, the at least one power control unit having a communications module configured to receive communications from the access administrator device to vary power from a mains power channel to an electrical device or system based at least in part on commands communicated over a local communications network.

In a further preferred aspect, the present invention is directed to a local power management network for dynamically reducing a portion of a load across a power grid. The network comprises a smartmeter having a processor configured to individually vary power to at least two different circuits. The device further comprises an access administrator device having a wireless communications module configured to communicate with a smartphone selectively using at least one peer-to-peer communications standard and a non-peer-to-peer communication standard, and a local network communications module configured to communicate with the smartmeter, the smartmeter having a communications module configured to receive communications from the access administrator device to vary power from a mains power channel to a circuit identified by the access administrator device for which power is to be varied.

In another preferred aspect, the present invention is directed to a system for selectively reducing load across a power grid. The system comprises a service platform including a processor and data storage means. The system further comprises a plurality of local power management networks, each local power management network including an access administrator device and a smartmeter, the access administrator device having a wireless communications module configured to communicate with a personal controller selectively using at least one peer-to-peer communications standard and a non-peer-to-peer communication standard, and a local network communications module configured to communicate with the smartmeter, the smartmeter having a communications module configured to receive communications from the access administrator device and provide the access administrator with an energy measurement metric as measured by the smartmeter, the processor of the service platform being configured to receive data regarding a tariff change or energy strain on a portion of a power grid associated with at least one of the local power management networks, the processor of the service platform being configured to issue an alert over a communications network to a personal controller associated with an access administrator of one of the local power management networks affected by the tariff change or energy strain on the power grid.

The reference to any prior art in this specification is not, and should not be taken as an acknowledgement or any form of suggestion that the prior art forms part of the common general knowledge in Australia or in any other country.

DETAILED DESCRIPTION OF THE DRAWINGS

Alternative embodiments of the invention will be apparent to those of ordinary skill in the art from consideration of the specification and practice of the invention disclosed herein. It is intended that the specification and examples be considered as exemplary only, with a true scope and spirit of the invention being indicated by the claims which follow. It will be understood that the term "comprising" is intended to have a broad, open meaning and not limited to a particular embodiment.

Figure 1:
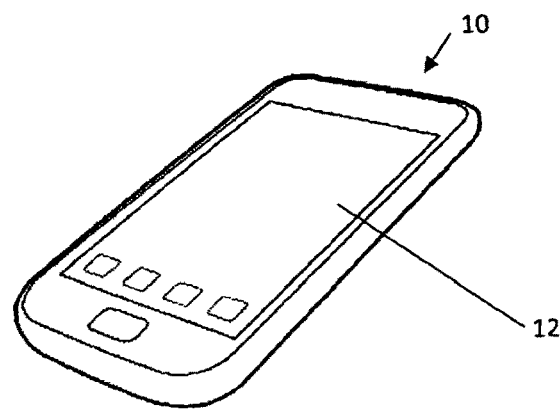
FIG. 1 is a perspective view of a smartphone for use with a preferred embodiment of the present invention.
Figure 2:
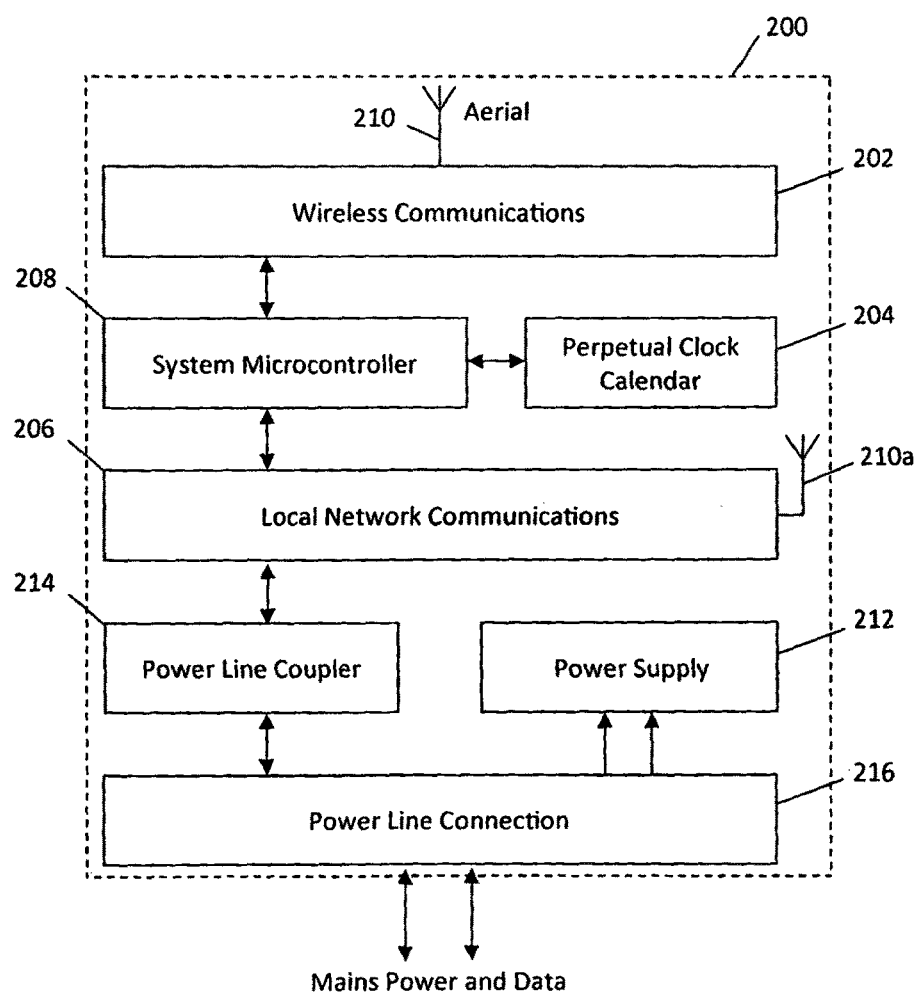
FIG. 2 is a block diagram of the functional elements of an access administrator in accordance with a preferred embodiment of the present invention.
Figure 3:
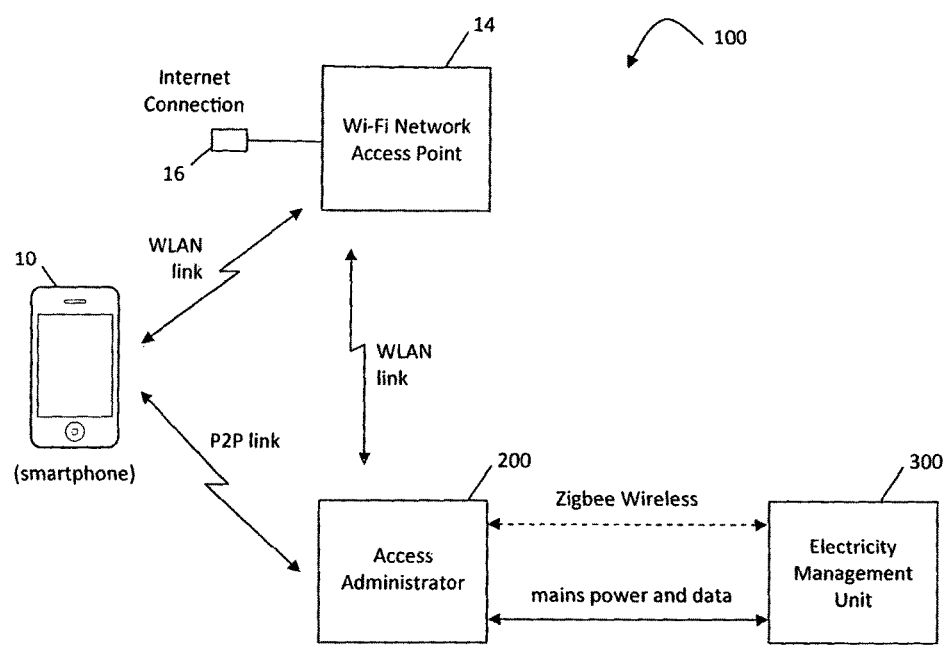
FIG. 3 is a system pictorial representation of the smartphone of FIG. 1 and its interaction with the access administrator of FIG. 2 and an electricity management unit.
Figure 4:
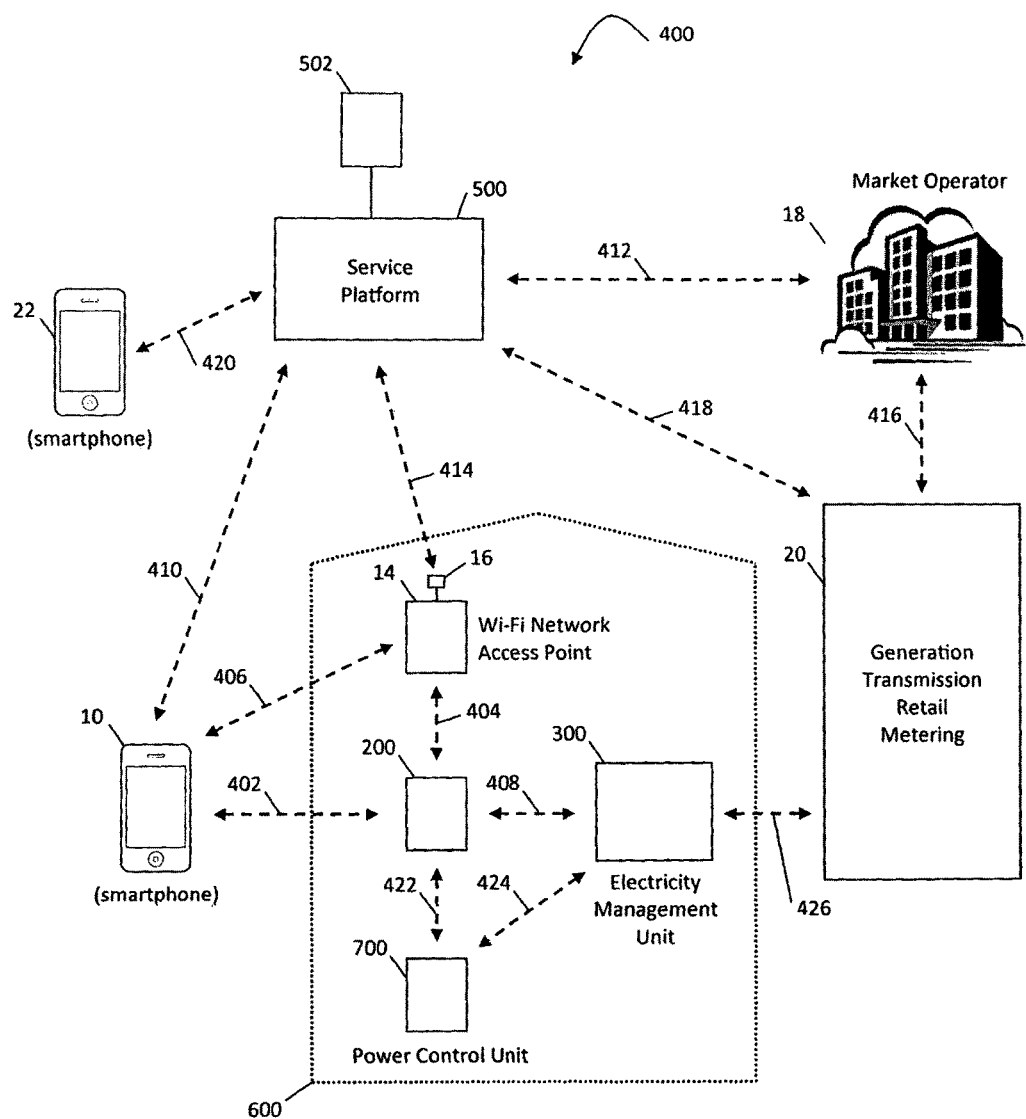
FIG. 4 is a pictorial representation of the communication pathways between the smartphone of FIG. 1, the access administrator of FIG. 2, an electricity management unit and a service platform.

Referring to FIGS. 1 to 3, system 100 preferably includes an applications program, hereby termed a "Product App," a personal controller 10, an access administrator 200, and an electricity management unit 300. It will be understood that the Product App is always used in combination with one or more processors, and where it is hosted, configures what might otherwise be a general purpose processor into a special purpose processor according to the functions and parameters of the Product App. Preferably, the Product App is downloaded to smartphone 10 and operates as a human interface for the control, configuration, programming and/or interrogation of access administrator 200 and electricity management unit 300 as well as a means for processing and exchanging data with access administrator 200, electricity management unit 300 and/or a service platform 500 (FIG. 4). System 100 preferably utilises combined wireless communications and power line communications in order to facilitate the exchange of data and commands. The communications between access administrator 200 and smartphone 10 preferably utilises a network WLAN, a wireless peer-to-peer connection, or both concurrently. The communications between access administrator 200 and electricity management unit 300 preferably uses power line communications through a power line communications protocol or wirelessly using Zigbee®. Access administrator 200 preferably draws its operational power from the same mains power lines used to exchange data with electricity management unit 300. The interaction of the Product App, smartphone 10, access administrator 200 and electricity management unit 300 will be described in further detail below.

By way of example, where access administrator 200 operates a network WLAN and peer-to-peer connection concurrently, access administrator 200 may allow third parties to control or access functions via the peer-to-peer connection without allowing access to the concurrent WLAN connection, thus preventing access to other WLAN devices. Alternately, access administrator 200 may allow remote monitoring of the system or data exchange via the network WLAN connection while limiting actual control of the system to the peer-to-peer connection.

FIG. 1 is a perspective representation of a smartphone 10 which uses a wireless link to communicate with an access administrator, described in further detail below. Smartphone 10 is preferably a commercially available, conventional smartphone. Some of the basic functions the smartphone preferably includes are: a touch sensitive graphical screen interface 12; a compatible radio transceiver; and the ability to run the Product App, specific to the individual smartphone operating system. In the examples that follow, specific coding for the Product App has been omitted for simplicity as a person of ordinary skill in the art would be able to understand and reproduce the functionality of the described embodiments without the need for discussion on particular coding.

Smartphone 10 is preferably configured to operate across a range of wireless communications technologies, including the technology to communicate via at least network Wi-Fi. Smartphone 10 may include additional capability for Wi-Fi Direct and/or Bluetooth® and/or NFC. While preferred embodiments of the present invention use a smartphone as its controller, and specifically a smartphone incorporating at least network Wi-Fi, other wireless communications methods and systems could be used depending on the specific requirements of the application of the invention.

Referring now to FIG. 2, an access administrator 200 is shown in accordance with a preferred embodiment of the present invention. Access administrator 200 has wireless communications module 202, perpetual clock calendar 204, local network communications module 206, system microcontroller 208 with embedded memory, an aerial 210, system power supply 212, power line coupler 214 and power line connection 216. Where local network communications module 206 includes support for wireless communications, it may preferably include dedicated aerial 210a. In some preferred embodiments, it may be preferable for system microcontroller 208 to support external memory in addition to, or instead of, embedded memory. In some preferred embodiments, it may be preferable for system microcontroller 208 and communications module 206 to be fully integrated.

Perpetual clock calendar 204 preferably includes a power backup by the way of a battery or supercapacitor enabling real time to be accurately maintained in instances where power is lost. Inclusion of a perpetual clock calendar 204 allows system microcontroller to automatically generate commands, perform a function, or exchange data based on schedules. In some preferred embodiments, perpetual clock calendar 204 may be omitted where access administrator 200 does not perform any time or date dependant operations or receives clock data from an external source via power line or wireless communications. In some preferred embodiments, perpetual clock calendar 204 may be integrated into system microcontroller 208.

Power line connection 216 is the physical interface for connecting access administrator 200 to the mains power wiring in a building. In one preferred embodiment, power line connection 216 is preferably configured for compatibility with the NEMA 5-15 North American mains power standard allowing access administrator 200 to plug directly into a mains power general purpose outlet. In one preferred embodiment, access administrator 200 may take the physical form of a fully self-contained plug in pack or "wall wart". In another preferred embodiment, access administrator 200 may have a flying lead. It will be appreciated that access administrator may be configured according to the plug and socket, and current and voltage requirements of various countries without departing from the scope of the present invention. In another preferred embodiment, power line connection 216 may preferably incorporate a terminal block configured for wiring directly into the mains power of a building or structure.

The commands and responses between system microcontroller 208 and smartphone 10 are communicated through a radio frequency wireless link supported by wireless communications 202 and aerial 210. Wireless communications 202 preferably includes any number of radios, transceivers, controllers and aerials that provide a network Wi-Fi and Wi-Fi Direct connection individually or concurrently with the ability to optionally support Bluetooth®. Examples of wireless communications are described in PCT Application No. PCT/AU2012/000959, filed Aug. 15, 2012. Depending on cost and the desired operational functions, wireless communications 202 may include a Wi-Fi radio, a combination of Wi-Fi radios, or a combination of Wi-Fi Radio(s), wireless radio(s) and a Bluetooth® radio. The wireless communication capabilities may be achieved by using: any number of discrete radios, aerials, transceivers and controllers either individually, collectively or as a SiP or SoC; a combination or "combo" chip that aggregates the functionality of a number of discrete transceivers and controllers of different standards as a SiP or SoC; or using a combination of combo chip(s), SiP(s), SoC(s) and/or discrete radios, aerials, transceivers and controllers. Wireless communications may utilize single or multiple wireless bands, physical channels, virtual channels, modes or other coexistence technologies and algorithms, the methods of which are already known to those skilled in the art and are not described herein. Depending on the chosen hardware components, wireless communications 202 may also include shared antenna support and shared signal receiving paths to eliminate the need for an external splitter or additional aerials. In a preferred embodiment, wireless communications 202 may be configured to support Zigbee®. If desired, an additional aerial or aerials may be added where shared antenna support is not feasible.

When wireless communications 202 operates using a peer-to-peer Wi-Fi standard, preferably Wi-Fi Direct, it can communicate with devices that support network Wi-Fi or Wi-Fi Direct on a peer-to-peer basis without the need for any intermediary hardware. Wireless communications 202 is preferably configured to operate according to the Wi-Fi Direct specification as both a Wi-Fi Direct group participant and Wi-Fi Direct access point or SoftAP, allowing access administrator 200 to appear to devices communicating with network Wi-Fi as a Wi-Fi access point. Through a SoftAP, wireless communications 202 is able to establish a peer-to-peer communications link with a network Wi-Fi device even though the network Wi-Fi device many not support Wi-Fi Direct. In this instance, a device using network Wi-Fi to communicate will receive a device discovery message from an access administrator 200 as if from a Wi-Fi access point and be able to establish a peer-to-peer communications link with the access administrator as though it were connecting to a Wi-Fi access point. The procedure of establishing a communications link between a Wi-Fi Direct device and network Wi-Fi devices are defined in the Wi-Fi Alliance specifications and would be understood by practitioners skilled in communications systems protocols.

Wi-Fi Direct has a number of advantages which simplify communications between an access administrator and a smartphone. Significant advantages include mobility and portability, where a smartphone and access administrator only need to be within radio range of each other to establish a wireless communications link. Wi-Fi Direct offers secure communications using Wi-Fi Protected Access protocols and encryption for transported messages, ensuring the system remains secure to qualified devices. Most importantly, Wi-Fi Direct allows a smartphone with only network Wi-Fi to engage in peer-to-peer data exchange with an access administrator even though the smartphone network Wi-Fi was never intended to support on-demand, peer-to-peer communications.

As smartphones continue to evolve, new models are starting to include Wi-Fi Direct support in addition to network Wi-Fi. In one preferred embodiment of the present invention, where an access administrator 200 and smartphone 10 exchange a Wi-Fi Direct intent as part of the discovery process, smartphone 10 and access administrator 200 will negotiate which device will assume the role of group owner in accordance with the Wi-Fi Alliance Wi-Fi Direct specification, and a peer-to-peer Wi-Fi Direct communication link will be established. The Wi-Fi Direct specification outlines a process of negotiation between Wi-Fi Direct devices to determine which will assume the role of group owner. Access administrator 200 in one preferred embodiment may preferably be configured at the highest priority to negotiate a Wi-Fi Direct connection as group owner. By operating as group owner, access administrator 200 can maintain a number of simultaneous peer-to-peer connections in what is commonly referred to as a hub and spoke arrangement.

System microcontroller 208 preferably incorporates a firmware program which defines the operation and functions of access administrator 200 and assumes responsibility for running program code and system elements, including specifying the operation of wireless communications 202, maintaining and interrogating perpetual clock calendar 204, and management of local network communications module 206. System microcontroller 208 preferably includes a non-volatile memory to store any program and configuration data. In some preferred embodiments, perpetual clock calendar 204 may be an embedded function of system microcontroller 208. In some preferred embodiments, non-volatile memory may be external to system microcontroller 208. In some preferred embodiments, more than one microcontroller may be used.

When access administrator 200 is manufactured, system microcontroller 208 preferably holds the firmware to operate access administrator 200 as a network Wi-Fi device and Wi-Fi Direct access point/group participant. When power is applied to access administrator 200 for the first time, system microcontroller 208 preferably starts access administrator 200 in Wi-Fi Direct mode and begins transmitting discovery messages that can be detected by a smartphone within wireless range.

It can be appreciated that an access administrator operating as a Wi-Fi Direct access point/group participant can communicate directly with a smartphone without needing a Wi-Fi WLAN. Access administrator 200 preferably appears as a Wi-Fi access point if smartphone 10 is not using Wi-Fi Direct to communicate; or negotiates with smartphone 10 as to which device will assume a Wi-Fi Direct group owner role if smartphone 10 is using Wi-Fi Direct to communicate. The user is then able to establish a peer-to-peer communications link and send commands directly to the selected access administrator without the need for any other device.

In one preferred embodiment, access administrator 200 in a peer-to-peer mode may be configured to preferably simulate a Wi-Fi access point or operate as a SoftAP without support for Wi-Fi Direct. In that case, a smartphone would preferably establish a peer-to-peer communications link with an access administrator as if connecting to a Wi-Fi access point, but could not negotiate with an access administrator a Wi-Fi Direct connection even if smartphone 10 supports Wi-Fi Direct.

A preferred method for configuring and controlling access administrator 200 is through a related Product App. Installation instructions for the Product App are preferably included with the access administrator. The Product App preferably adopts the same centralized app store installation methods commonly utilised by conventional smartphone platforms.

The Product App may communicate with any mix of wireless elements and radio technologies to seamlessly provide the best communications link with an access administrator. The Product App preferably controls smartphone 10 wireless communications in order to initiate, search and establish a wireless communications link with an access administrator. The Product App may preferably display preconfigured and new access administrators via graphical elements on smartphone touch screen 12.

When the Product App starts, it will preferably scan for access administrators and identify any new access administrator that needs to be initially configured. At this point the Product App preferably allows the user to establish a peer-to-peer connection with a new access administrator. The Product App preferably allows the user to determine if an access administrator is: to remain a Wi-Fi Direct access point/group participant only; connect to a WLAN as a client and become a network Wi-Fi device; or, where supported by access administrator wireless communications 202, operate concurrently as a Wi-Fi Direct access point/group participant and network Wi-Fi device.

In a situation where the smartphone operating system does not allow the Product App to control the smartphone wireless communications in order to establish a peer-to-peer link with an access administrator, the user may use any mechanism provided by the smartphone to establish a peer-to-peer communication link with an access administrator prior to starting the Product App.

If the user wants the new access administrator to run in Wi-Fi Direct mode, they preferably select this option in the Product App. The Product App then leads the user through a series of data inputs using the smartphone's touch screen 12 as a human interface. The Product App communicates with system microcontroller 208 and replaces the general parameters used for the initial connection to specific parameters which define the access administrator as a unique Wi-Fi Direct product. These may include: setting a unique encryption key so all data transfers between the access administrator and the smartphone are protected; setting the access administrator name to a unique, easily recognisable identifier; and setting a password in the access administrator used to establish a secure link with a smartphone.

The Product App preferably maintains a record of these specific parameters in the smartphone memory for future identification of, and connection to, the configured access administrator.

Once the setup procedure is complete, the Product App preferably commands the access administrator firmware to "restart". When the applications firmware restarts, the access administrator will use the user specified data to populate and create its own unique identity. The smartphone which was used to set this identity will be able to automatically connect to that access administrator because the new specific parameters are known. Where the smartphone operating system allows, the Product App can then be used to preferably automatically establish a communications link with the access administrator each time the user selects that particular device in the Product App.

Once an access administrator has been configured, any other smartphone can only connect if the user knows the specific parameters that are now unique to that particular access administrator. If a second smartphone searches for Wi-Fi access points or Wi-Fi Direct devices, it will see the configured access administrator with the characteristic that it is "secure". To connect to it, the user will have to know the specific password allocated to that access administrator, otherwise it will not be able to establish a communications link. If the password is known and entered into the smartphone when requested, a communication link between the second smartphone and the access administrator will be established. The Product App is still preferably required to control the access administrator and this may have additional security measures depending on the nature of the application.

If, instead of configuring the newly installed access administrator in Wi-Fi Direct mode, the user chooses it to operate in network Wi-Fi mode, this is selected as the required option and the Product App determines if there are one or more WLANs available for the access administrator to connect to as a client. The Product App requests the user to confirm the preferred network and asks the user to confirm and/or input any necessary network parameters such as the network password so the access administrator can connect to the WLAN as a client.

The Product App, via the smartphone, communicates with system microcontroller 208 and sets the parameters needed for the access administrator to establish itself as a network Wi-Fi device which may include any parameters that uniquely identify the access administrator on the network. When all of the appropriate parameters are known and updated, the Product App commands the access administrator to restart its firmware as a network Wi-Fi device. The access administrator then connects to the WLAN as a client and is accessible by the smartphone Product App via the WLAN access point. The access administrator running as a network Wi-Fi client can then be controlled by other smartphones on the same WLAN. In one preferred embodiment, it may be desirable for the access administrator to include additional security measures such as password protection, a socket layer with the Product App, or other measures to prevent the access administrator being controlled by other devices on the network without authorization.

Preferably, where the smartphone is configured to determine from an access administrator's wireless signal that the access administrator is a new wireless device that can be configured as a WLAN network client, the smartphone preferably allows a user to automatically input the necessary network parameters of a known WLAN network from the smartphone's memory into the access administrator to automatically configure the access administrator as a network client of the known WLAN network. The smartphone may also preferably be able to determine from the access administrator's wireless signal a product identifier allowing the smartphone to automatically download the access administrator's related Product App from the appropriate app store.

Once an access administrator has been configured as a Wi-Fi Direct access point/group participant or a network Wi-Fi device, it preferably continues to operate in that mode even after it has been powered off and then on again. All of the specific operating parameters for each mode are preferably saved in the non-volatile memory and are retained if power is removed. When power is restored, system microcontroller 208 powers up the same Wi-Fi mode that was running before power was removed, and the appropriate firmware and operating parameters are restored from non-volatile memory.

There are applications where an access administrator running concurrent Wi-Fi Direct access point/group participant and network Wi-Fi capabilities is desirable. In this situation, the user via the Product App may activate both modes, allowing either mode to be used. Equally, the user, via the Product App, can choose to disable one of the modes, or can change the Wi-Fi mode from Wi-Fi Direct mode to network Wi-Fi mode, or vice versa, as desired.

Each time the Wi-Fi mode is changed, the parameters for the new mode are preferably retained by system microcontroller 208 in the event power is disconnected or lost. When power is restored, system microcontroller 208 powers up in the same Wi-Fi mode as previously operating before power was removed, and the appropriate operating parameters are restored from the non-volatile memory. Thus, system microcontroller 208 preferably is configured with an adapted default setting that can be restored from the non-volatile memory.

It is envisaged that there may be times when an access administrator may need to be completely reset. The Product App is preferably able to communicate with an access administrator and command it to re-initialise to the factory default configuration. In this case, all user-defined parameters that were loaded into the access administrator are lost and it is returned to its factory default state, ready to receive new user-defined parameters.

The access administrator may incorporate a human interface in the form of touch pads, buttons or switches which the user could use to cause the access administrator to: re-initialise to the factory default configuration without the use of a smartphone or Product App; reboot the system; or assist in a Wi-Fi Protected Setup. In one preferred embodiment the access administrator may be configured to accept a command via local network communications module 206 using a power line communications connection or a wireless Zigbee® connection causing it to re-initialise to the factory default configuration without the direct wireless use of a smartphone or Product App on the smartphone. If desired, the access administrator may be configured for operation without any manual inputs on the device itself.

In one preferred embodiment, wireless communications 202 may include Bluetooth® capabilities in addition to Wi-Fi Direct and network Wi-Fi capabilities. Referring to FIG. 3, a peer-to-peer Bluetooth® communication link between smartphone 10 and access administrator 200 may be used by the Product App to enter parameters for establishing a Wi-Fi Direct or network Wi-Fi communications link, or open a Wi-Fi Direct or network Wi-Fi communications link, or may in its own right operate as a peer-to-peer communications link for exchange of data between the Product App and access administrator 200. The Product App or a human interface on access administrator in the form of a touch pad, button or switch may facilitate the establishment of a Bluetooth® peer-to-peer connection between access administrator 200 and smartphone 10. The Product App may be configured to allow a user to specify Bluetooth® as the preferred peer-to-peer communication method between access administrator 200 and smartphone 10.

Where smartphone 10 and access administrator 200 use a proprietary implementation of peer-to-peer Wi-Fi or an adaptation of Wi-Fi Direct, access administrator 200 and smartphone 10 are preferably configured to use the handshake, negotiation methods, protocols and configuration requirements particular to that proprietary implementation of peer-to-peer Wi-Fi or adaptation of Wi-Fi Direct, and may incorporate any hardware, software, firmware or authentication schemes necessary, and may use Bluetooth® to facilitate the process where supported.

In one preferred embodiment, the access administrator may include NFC capability that the Product App could use when first communicating with a new access administrator to automatically establish a Wi-Fi Direct, Bluetooth® or other peer-to-peer communications link with those smartphones that support NFC. This process is commonly referred to as "bootstrapping" and is an established method for initializing communications familiar to those of ordinary skill in the art.

Referring back to FIG. 2, local network communications module 206 preferably includes any combination of integrated circuits, components, controllers, digital signal processors, transceivers, memory, microprocessors, SiPs, or SoCs that allow system microcontroller 208 to communicate with an electricity management unit preferably through the mains wiring of a building using a power line communication protocol. In one preferred embodiment, power line communications may be implemented using a single chip solution with integrated random access memory (RAM), physical layer (PHY), medium access controller (MAC), and analog front end. Local network communications module 206 preferably supports any of: the HomePlug Powerline Appliance Homeplug standards and/or specifications including HomePlug Green PHY; IEEE 1901, 1901.1, 1901.2 standards and/or specifications; and/or ITU-T's G.hn standards and/or specifications; including any amendments, extensions, subsets, revisions or proprietary implementations. Other suitable standards and/or specifications include, but are not limited to, those from the Universal Powerline Association, SiConnect, the HD-PLC Alliance, Xsilon, and the Powerline Intelligent Metering Evolution Alliance.

In one preferred embodiment, in addition to, or instead of, power line communications, local network communications module 206 preferably includes the necessary hardware, transceivers, components and/or controllers to support wireless communication with an electricity management unit via any suitable PAN or HAN standard, protocol and/or specification configurable for use in the utility industry including any Zigbee® protocol or standard published by the Zigbee® Alliance; any protocol or standard published by the WI-SUN Alliance; and/or any protocol or standard based on IEEE 802.15 including, but not limited to, IEEE 802.15.4.

Because power line communications can travel outside a user's building via the mains power wiring, access administrator 200 preferably supports encryption for communications with an electricity management unit 300. Access administrator 200 and electricity management unit 300 preferably adopt the standards and/or specifications for security and encryption of data including any passwords, security keys or other secure linking methods that are native to the chosen power line communication protocol.

In one preferred embodiment, and without limiting the ability to use any other pairing techniques of a particular power line communications standard and/or protocol, where access administrator 200 and electricity management unit 300 communicate using a HomePlug Powerline Appliance standard and/or specification, a secure communication pathway between electricity management unit 300 and access administrator 200 may preferably be formed by entering a network membership key of the electricity management unit into access administrator 200 via the Product App, thereby configuring access administrator 200 and electricity management unit 300 with the same network membership key and allowing them to form a secure network. The network membership key may be recorded on electricity management unit 300, or in paperwork or an electronic format associated with electricity management unit 300. The network membership key may be obtained by preferably entering a serial number such as the serial number of an electricity management unit 300 into the Product App, the Product App then accessing a service platform using the smartphone's native cellular or network Wi-Fi capabilities, and exchanging the serial number for the network membership key assigned to electricity management unit 300 identified by the serial number, which Product App could then preferably automatically load into access administrator 200.

Electricity management unit 300 and access administrator 200 are preferably provided together as a matched pair with all networking requirements already preconfigured. For example, access administrator 200 may be provided with all networking requirements entered by the vendor of access administrator 200, thereby being preconfigured to establish a secure network with a particular electricity management unit 300.

If desired, access administrator 200 may include a human interface such as a button, switch or touch pad that could be used to put access administrator 200 into a secure pairing mode for the purpose of establishing a secure communications link with electricity management unit 300.

A secure network between access administrator 200 and electricity management unit 300 may be limited to access administrator 200 and electricity management unit 300 if desired, thereby forming a private secure network or dedicated peer-to-peer communication pathway. A software, firmware or hardware layer in access administrator 200 and electricity management unit 300 may be included to provide an additional security service preventing other devices from communicating with access administrator 200 or electricity management unit 300 even if on the same physical layer using the same network membership key or security credentials, thereby maintaining a peer-to-peer communications pathway between access administrator 200 and electricity management unit 300.

Referring to FIG. 2, data is physically modulated onto the mains wiring preferably through power line coupler 214 which preferably includes any necessary isolation or filters.

Access administrator 200 may be configured to include one or more illumination means or visual elements. A visual element could be by way of simple light emitting diodes, LCD, colour LCD, an integrated display, or any combination thereof.

It will be appreciated by those of ordinary skill in the art that the system described above can be varied in many ways without departing from the scope of the present invention. By way of example only, elements of wireless communications module 202, system microcontroller 208, perpetual clock calendar 204 and local network communications module 206 may be aggregated or separated into single components, SoCs or SiPs. For example only, wireless Zigbee® communications may be added to local network communications module 206, and operate individually, concurrently, or completely replace, power line communications. If desired, power line communications and Zigbee® wireless communications may be aggregated into a single SoC or SiP.

FIG. 3 is a pictorial representation of system 100 showing an exemplary arrangement of smart phone 10, access administrator 200, electricity management unit 300 and preferred communications systems connecting each of the elements. Electricity management unit 300 is preferably configured to monitor electrical flow and usage. Electrical management unit 300 may be, for example only, a smartmeter. The Wi-Fi WLAN has an access point 14. Access point 14 has an Internet connection 16. Wi-Fi WLAN communications preferably pass through access point 14. Where access administrator 200 is configured as a network Wi-Fi device, it preferably operates as a client of access point 14. For smartphone 10 to communicate with access administrator 200 running as a network Wi-Fi client, smartphone 10 is also preferably connected to access point 14 as a client. Messages from smartphone 10 could then pass through access point 14 to access administrator 200. If smartphone 10 were not in wireless range of access point 14, it may still be able to communicate with access point 14 via internet connection 16 if so configured. The communications between a smartphone and an access point through an Internet connection would be well understood by those of ordinary skill in the art.

In addition to, or instead of, operating as a network Wi-Fi device, access administrator 200 may be configured as a Wi-Fi Direct access point/group participant. In that instance, smartphone 10 can wirelessly connect directly to access administrator 200 peer-to-peer without requiring any other device. Accordingly, it can be seen that: (1) access point 14 is not required for peer-to-peer communications; (2) the communications link is formed on an "as needed" basis; and (3) that smartphone 10 needs to be within radio range of access administrator 200 to establish a direct communications link. If desired, a peer-to-peer connection between smartphone 10 and access administrator 200 may be established using Bluetooth®.

It can be appreciated that a network Wi-Fi connection and a peer-to-peer connection offer a different mix of convenience and security. An access administrator operating as a network Wi-Fi device may be remotely controlled by a smartphone where the access point has an internet connection, however the access administrator then becomes exposed to the outside world and may be vulnerable to external threats such as hacking. Alternatively, a peer-to-peer connection by virtue of its limited wireless range and architecture offers a higher level of security. The balance between operational modes is usually subjective and dependant on the application at hand. In some instances infrastructure limitations such as the availability of a WLAN may further constrain operational modes.

Access administrator 200 may be configured to provide a received signal strength indicator, or received channel power indicator, of access point 14 which access administrator 20 may preferably report to the Product App for display on smartphone screen 12. A received signal strength indicator, or received channel power indicator, is a measurement of the power present in a received radio signal and allows a user to locate wireless products such as access administrator 200 close enough to access point 14 in order to ensure that a sufficiently strong wireless signal exists between the two devices to provide the best environment for a stable and reliable communications link. The Product App also preferably displays on smartphone screen 12 a received signal strength indicator, or received channel power indicator, for access administrator 200 measured by smartphone 10. The Product App may display on smartphone screen 12 a received signal strength indicator, or equivalent, of a Zigbee® wireless signal from electricity management unit 300 measured by access administrator 200.

If desired, access administrator 200 may be configured with a visual indicator capable of displaying a received signal strength indication for any wired or wireless signal that access administrator 200 may be capable of measuring.

Referring again to FIG. 3, access administrator 200 preferably derives its power and communicates with electricity management unit 300 through mains power lines using power line communications. It can be appreciated that power line communications allow for the convenient placement of an access administrator within a building's mains power architecture.

Access administrator 200 may be configured to communicate with electricity management unit 300 using a Zigbee® wireless standard instead of, or additional to, using power line communications. Where access administrator 200 is configured with the ability to communicate using Zigbee® and/or power line communications, and electricity management unit 300 supports both Zigbee® and/or power line communications, access administrator 200 preferably includes the ability to dynamically assess the most robust communication channel with electricity management unit 300 and use the most robust communication medium in forming a communications link or transferring data down open communication links. It can be appreciated that some electricity management units may be installed with only Zigbee® wireless communication capabilities. Preferably, access administrator 200 is configured with both Zigbee® wireless and power line communications, but only operates using Zigbee® wireless with those electricity management units that only support Zigbee®. Access administrator 200 may be configured with Zigbee® wireless and no power line communications for use with those electricity management units that only support Zigbee®.

Because smartphones do not include native power line or Zigbee® communication capabilities, they cannot communicate directly with an electricity management unit 300. Access administrator 200 preferably performs any computational tasks necessary to ensure data from the Product App is transposed into a format compatible with electricity management unit 300, and data from electricity management unit 300 is transposed into a format compatible with the Product App, thereby facilitating two way communications between the Product App and electricity management unit 300 as shown in FIG. 3.

In order for the Product App running on smartphone 10 and electricity management unit 300 to communicate, any data preferably passes between access administrator 200 and smartphone 10 wirelessly either peer-to-peer or via WLAN, depending on the chosen configuration of access administrator 200. Any data passing between access administrator 200 and electricity management unit 300 preferably does so over a building's mains power wiring using power line communications, or wirelessly using Zigbee® where configured.

Electricity management unit 300 is preferably configured to report a broad range of data to the Product App. For example, this may include instantaneous voltage, current and power, Irms and Vrms, average real and apparent power, energy-to-pulse conversion, tariffs, electricity consumed over a pre-defined time period, and any other data or metric that may be measured, recorded or stored in electricity management unit 300. Once the appropriate data has been transferred to the Product App, the Product App can preferably perform any necessary additional calculations or conversions and display the results on the smartphone's touch sensitive screen for the user to view.

Preferably, the Product App is configured to use a smartphone's cellular or network Wi-Fi capabilities to exchange data with a service platform. Exchange of data with a service platform could include, by way of example only, data for the purpose of calculating or displaying trend analysis, historical analysis, comparative analysis, granular metrics, costing, tariffs, billing and any other uses of the electrical data measured by electricity management unit 300.

In a preferred embodiment, the Product App is configured to use data from electricity management unit 300 and, where necessary, data from a service platform to determine and display present energy usage represented in a cost per unit of time. In that way, a user through the Product App may determine the total instantaneous cost per unit of time as an aggregation of the electricity consumed by all electrical apparatus connected to electricity management unit 300 relative to the tariff.

In order to reduce power consumption and promote environmentally friendly energy use, a user may also find it advantageous to determine the consumption metrics of an individual electrical apparatus in a cost per unit of time. The Product App is preferably configured to allow a consumer to "zero" the instantaneous cost per unit of time to effectively establish a base against which any subsequent variation in electricity consumption could then be used to calculate and display an instantaneous cost per unit of time relative to the measured variation of electricity consumed from the base. In that way a user could preferably zero the instantaneous cost per unit of time and then turn on an individual electrical apparatus to see how much that apparatus cost to run represented in a cost per unit of time. Alternately, a user could also preferably zero the instantaneous cost per unit of time and then turn off an individual electrical apparatus to see how much turning off that apparatus would save represented as a negative cost per unit of time or saving per unit of time.

The Product App is preferably configured to allow the user to save the calculated cost per unit of time associated with an individual electrical apparatus into the Product App to compile a database so that the user may quickly and easily identify and compare the electrical consumption profiles of a range of products and/or systems.

Where electrical management unit 300 supports time of use tariffs, the Product App preferably displays the cost per unit of time for the present tariff as well as a cost per unit of time for any other tariff.

The Product App is preferably configured to allow a user to enter a number of parameters such as the day or days, time of day and for how long an electrical apparatus is operational, allowing the Product App to use any combination of cost per unit of time measurements and calculations, tariffs and operational times to display an estimated cost for an individual electrical apparatus or collection of electrical apparatuses over a user definable period of time. The Product App is preferably configured to analyse the cost of an individual electrical apparatus, or collection of electrical apparatuses, over a user definable period of time and suggest a means to minimise cost by reducing and/or shifting the use of an apparatus, or apparatuses, to more efficient days or periods in a day depending on analysis of any variable time of use tariffs. The Product App is preferably configured to offer an alert to avoid operating a particular electrical apparatus, or apparatuses, in response to an anticipated spike in peak demand.

It can be appreciated that cost per unit of time could equally be substituted or supplemented with a number of different metrics without departing from the scope of the present invention. By way of example only, other suitable metrics may include instantaneous power represented in kW/hrs, an amount of a greenhouse gas generated per hour, and/or an equivalent carbon emissions value based on the electricity being used. If a carbon emissions metric is utilised, parameters used to calculate a real-time carbon emissions preferably include power usage and power source (e.g., coal burning source, hydro, wind and/or solar).

Electricity management unit 300 may be configured as a power control device capable of regulating the supply of electricity to one or more other devices and/or circuits within a building. The Product App may be configured to preferably allow a user to issue commands to electricity management unit 300, causing it to vary the supply of electricity to one or more devices and/or circuits based at least in part on instructions communicated from the Product App. In that way, and by example only, a user could schedule the supply of electricity to one or more devices and/or circuits, the schedule being executed by electricity management unit 300 without needing a communications link with the smartphone. System microcontroller 208 may also be configured to preferably issue commands to electricity management unit 300, causing it to vary the supply of electricity to the one or more devices and/or circuits based at least in part on instructions communicated from the Product App. In that way, and by example only, a user could schedule the supply of electricity to one or more devices and/or circuits, the commands being generated by system microcontroller 208 without needing an ongoing communications link with the smartphone.

Where electricity management unit 300 is configured as a demand response enabled device capable of varying power to one or more devices and/or circuits within a structure based on a trigger event being received by electricity management unit 300, a user through the Product App may preferably configure an action to be taken by electricity management unit 300 in response to a trigger event. A trigger event may include, but is not limited to, variation of a tariff or the receipt of a demand response command, threshold, flag, notification or data packet.

Access administrator 200 may include a display if desired. A user preferably uses the Product App to configure the information to be shown on the display. The display preferably shows a series of visual indicators and/or coloured visual indicators and/or characters including any appropriate language support. Microcontroller 208 is preferably able to manipulate the visual elements of the display based on metrics reported from electricity management unit 300 in order to visually allow a user to interpret their electricity metrics at any point in time. By way of example only, the display may dynamically show the cumulative cost in dollars of the total bill for the current reporting period based on the electricity consumption being reported by electricity management unit 300 while coloured indicators may represent the current tariff level in a visual rather than numerical form, ranging say from green for a normal tariff to yellow for shoulder and red for peak tariff conditions. The display may also include a visual representation of speed, such as a rotating disc or pointer graphic, speed of the movement of the disc or pointer graphic increasing or slowing commensurate with the relative total power being consumed in much the same way that the mechanical discs move in older power meters. In a preferred embodiment, the display mirrors what is shown on the smartphone screen.

The system preferably includes a budget alert feature to help a user control their energy costs. Preferably, a user may enter into one or more fields of the Product App a desired budget for a defined period of time. The Product App preferably uses the data from electricity management unit 300 and, where necessary, data from a service platform to display the current cumulative consumption for the relative time period within the defined budget period, thereby allowing the user to determine how much of their budget had been used at that point. The Product App preferably calculates the average consumption over the analyzed time period and applies the average to the time remaining in the defined budget period to determine if the current rate of consumption would result in the desired budget being exceeded. The Product App may visually display the result and where the current rate of rate consumption would result in the desired budget being exceeded, suggest a target daily consumption rate to meet the desired budget. The Product App may preferably conduct budget calculations in the background and alert a user where it calculates that the current rate of rate consumption would result in the desired budget being exceeded.

FIG. 4 is a pictorial representation of a system 400 having a plurality of communication pathways between and amongst smartphone 10, access administrator 200, electricity management unit 300, a service platform 500, a residential or commercial local power management network 600, a market operator 18 and an electricity industry participant 20. It will be appreciated that other communications pathways or arrangements may be possible and within the scope of the present invention.

Several communications pathways are similar to those described above in relation to FIG. 3. In particular, wireless peer-to-peer connection 402 between smartphone 10 and access administrator 200, WLAN connection 404 between access administrator 200 and access point 14, WLAN connection 406 between smartphone 10 and access point 14, and power line communication and/or Zigbee® wireless connection 408 between access administrator 200 and electricity management unit 300 are preferably configured as described above for system 100.

Continuing with reference to FIG. 4, service platform 500 is preferably an applications service platform or software as a service platform that communicates with smartphone 10, and preferably the Product App, via a cellular connection 410 and/or internet connection 414, depending on the cellular capabilities of smartphone 10 and/or the connection of smartphone 10 to access point 14 and access point 14 having internet connection 16, the methods of which would be well understood by those of ordinary skill in the art.

As shown in FIG. 4, residential or commercial network 600 is preferably composed mainly of system 100 shown in FIG. 3, with one or more power control units 700 (described in further detail below). Network 600 is preferably contained within a building or unit of a building, and in communication with one or more of smartphone 10, service platform 500, and electricity participant 20.

Market operator 18 is preferably responsible for controlling and managing the assets of electricity industry participant 20 in order to ensure the generation and power fed into an electricity grid can satisfy demand at any particular point in time. Electricity industry participant 20 is preferably a party responsible for at least one of the actual generation, transmission, retailing and metering of electricity, for example, a utility company. In certain situations, and depending on a particular nation's regulatory framework, market operator 18 and electricity industry participant 20 may be the same entity without changing the scope of the invention.

Because it is very costly and difficult to store electrical energy, the instantaneous demand for power is satisfied through a system of bringing electrical generators online to increase capacity during high consumption periods and taking generators offline to shed load when the electricity being produced exceeds what is optimally required. The supply of power into a grid is typically a competitive process where a market operator 18 through communication pathway 416 puts an offer to the market to purchase an amount of power required to meet anticipated demand. Communication channel 416 could be by way of the internet, wireless, satellite, telephone or a direct line, the actual communication standard and methodology of which is not material as long as data can be exchanged between market operator 18 and electricity industry participant 20 through a medium and in a format that the recipient can interpret and use. Typically, electricity industry participants such as generators bid to meet the offer of market operator 18 who usually chooses the lowest bid and schedules the electrical supply from the winning generator. Market operator 18 typically utilizes highly sophisticated predictive modelling to anticipate future energy requirements in order to efficiently manage the generation assets of electricity industry participant 20.

In that way, cheaper forms of electricity generation typically provide what is referred to as the base load with more expensive forms of electricity generation supplying what is referred to as peak loads. Cheaper forms of electricity generation typically use higher polluting fuels while more costly forms of electricity generation use cleaner fuels. Cheaper forms of electricity generation also typically take a long time to bring up to operational speed and are not suitable to meet the uncertain timing of peak power demand. Peak power demand is usually met by generators that can be brought online quickly, but typically consume expensive fuel in order to reach operational speed quickly.

The problem for the electricity industry is that the cycle of peaks and troughs in energy generation and consumption place a strain on the transmission infrastructure; result in a very high cost for electricity produced during peak periods; and favour low cost, but higher polluting generation methods, to supply the bulk of energy requirements. It is therefore highly advantageous to smooth energy consumption by reducing demand during peak periods, while also looking to push energy intensive tasks into off peak periods to reduce the need for additional base load generation using higher polluting methods.

It will be appreciated that the description of the electricity market above has been simplified considerably, and may differ from market to market. However, this simplification does not substantially affect consideration of the present invention.

Service platform 500 preferably includes the necessary computer(s), computing device(s), server(s) and/or technologies capable of processing data and/or analysing data and/or compiling data and/or transposing data and/or storing data and/or exchanging data and/or transferring data and/or receiving data and/or manipulating data in any necessary way and can communicate with at least smartphone 10 and may also preferably communicate with market operator 18 and/or electricity industry participant 20 and/or another third party, using any available communication pathway, or pathways, and communication technologies. In one preferred embodiment, service platform 500 may also communicate with access administrator 200.

Data that service platform 500 handles may include, but is not limited to, information from electricity management unit 300, forecasting, notifications, analysis of any metric, tariffs, historical information, billing information, usage information, user data, user measurements, location information including global positioning data, demand response configurations, alerts, support information, customer service information, fault reports, contracts, agreements, request for service, offers, email, short message service (SMS), and push notifications.

It will be appreciated that the data capabilities of service platform 500 allow it to act as an intermediary or clearing house for a number of services. By way of example, in one preferred embodiment, market operator 18 through communication pathway 412 could supply service platform 500 with forward forecasting of the anticipated demand for electricity. Communication channel 412 could be by way of the internet, wireless, satellite, telephone or a direct line, the actual communication standard and methodology of which is not material as long as data can be exchanged between market operator 18 and service platform 500 through a medium and in a format that the recipient can interpret and use. Using the forward forecast data from market operator 18, service platform 500 preferably generates a message for smartphone 10 warning consumers that a peak demand period was expected at a particular time and deliver that message using cellular connection 410 and/or internet connection 414, through WLAN connection 406 between smartphone 10 and access point 14. Consumers then preferably use smartphone 10 through access administrator 200 to interrogate electricity management unit 300 in order to determine current and anticipated energy consumption at the expected peak demand period in order to manage their own power consumption in response to the data from market operator 18.

Any message from service platform 500 to smartphone 10 is preferably delivered as a push notification to the Product App. It will be appreciated that the use of additional intermediary services from Google, Microsoft, Apple or another third party may be required in order for service platform 500 to effect a push notification to the Product App, the methods of which would be understood by those of ordinary skill in the art. Alternatively, the message from service platform 500 could be delivered by way of SMS to smartphone 10. It will be appreciated that the use of additional intermediary services from a telecommunications company may be required in order for service platform 500 to send an SMS to smartphone 10, the methods of which would be understood by those of ordinary skill in the art. If desired, the user may be presented with an option to select a message delivery means as their preferred delivery means. For example, the user may select to receive notifications via e-mail.

Service platform 500 preferably exchanges data with a party in the electricity industry participant 20 through communication pathway 418 rather than, or in addition to, market operator 18. Communication pathway 418 could be by way of the internet, wireless, satellite, telephone or a direct line, the actual communication means and methodology of which is not material as long as data can be exchanged between a party in electricity industry participant 20 and service platform 500 through a medium and in a format that the recipient can interpret and use.

It will be appreciated that a communication pathway between electricity industry participant 20 and service platform 500 could, with the facilitation of service platform 500, be created to form a communication pathway between electricity industry participant 20 and smartphone 10, and preferably Product App running on smartphone 10, utilizing the communication pathway between service platform 500 and smartphone 10 through cellular connection 410 and/or through internet connection 414, depending on the cellular capabilities of smartphone 10 and/or the connection of smartphone 10 to access point 14 and access point 14 having internet connection 16.

Potential uses for a communication pathway between electricity industry participant 20 and smartphone 10, and preferably the Product App running on smartphone 10, could include the exchange of data for forecasting, location, notifications, analysis of any metrics, comparative analysis against other consumers, tariffs, historical information, billing information, usage information, user data, user measurements, demand response configurations, alerts, technical support information, customer service information, request for service, offers, contracts, agreements, fault reports, email, SMS and push notifications. By way of example, and with reference to FIG. 4, electricity industry participant 20 through communication pathway 418 could use service platform 500 as an intermediary for supplying smartphone 10 with forward forecasting of the anticipated demand for electricity which electricity industry participant 20 may have received from market operator 18 through communication pathway 416. By way of another example, electricity industry participant 20 through communication pathway 418 could use service platform 500 as an intermediary for supplying smartphone 10 with an alert for a variation in tariff that electricity industry participant 20 was about to implement in electricity management unit 300 through communication pathway 426. Communication pathway 426 could be by way of the internet, wireless, satellite, telephone or a direct line, as long as data can be exchanged between an electricity industry participant 20 and electricity management unit 300 through a medium and in a format that the recipient can interpret and use.

Service platform 500 is preferably capable of communicating and exchanging data with any smartphone running the Product App. Service platform 500 may be configured as a gateway mechanism for smartphone 10, through cellular connection 410, to remotely communicate with access administrator 200 through internet connection 414 where access administrator 200 is configured as a client of access point 14.

Turning again to FIG. 4, smartphone 22 depicts an example of a separate smartphone from smartphone 10 that would preferably communicate with the access administrator and electricity management unit installed in the building respective to the owner of smartphone 22. Smartphone 22 may run an entirely different operating system to smartphone 10, but as long as smartphone 22 is adapted to install and run the Product App, it would preferably be able to communicate with service platform 500 in the same way as smartphone 10 running the Product App. Communication pathway 420 preferably replicates the relationship defined for cellular connection 410, internet connection 414, WLAN connection 406, access point 14 and internet connection 16 in relation to smartphone 10 and service platform 500.

Preferably, the Product App is configured to upload any data stored by it on an associated smartphone; any data extracted from, or reported by, an associated smartphone such as user or location data; any data extracted from, or reported by, an associated access administrator; and/or any data extracted from, or reported by, an electricity management unit, to service platform 500. Service platform 500 may choose to share any information uploaded to it with a market operator 18 or an electricity industry participant 20.

Service platform 500 preferably calculates and delivers to smartphone 10 an analysis of the data from the Product App running on smartphone 10 and/or electricity management unit 300, and may perform a comparison with data compiled from the Product App and/or electricity management unit associated with other smartphones providing data to service platform 500.

By way of example only, the user of smartphone 10 via the Product App may choose to transfer tariff and/or usage data from the Product App and electricity management 300 to service platform 500. Service platform 500 preferably delivers data to smartphone 10, allowing the resident Product App to generate and/or display a comparison against the data supplied by other smartphones reporting to service platform 500. In that way a user could, for example, compare their electricity consumption against an average for the electricity consumed in a similar structure, or analyse the impact of a tariff from an alternate energy retailer on their actual electricity usage and tariff over a defined time period. By way of another example, smartphone owners through the Product App could preferably elect to upload the measured consumption metrics of an electrical apparatus to service platform 500. Service platform 500 could create a database 502 (FIG. 4) where other smartphone users through a Product App resident on the smartphone, or through a website portal, could browse the measured consumption metrics of a chosen electrical apparatus.

Referring to FIG. 4, database 502 is preferably configured to store consumption metrics from a plurality of sources for one or more electrical devices and/or systems. In a preferred embodiment, platform 500 utilises the consumption data stored in database 502 to generate ratings information for a given electrical apparatus or system. It will be appreciated that the data may be stored in the cloud if desired rather than a single database server.

The ratings information preferably includes energy efficiency ratings and average power consumption costs over a predetermined time period (e.g., weekly, fortnightly, monthly and/or annual) for each electrical device or system. Each electrical device or system may be categorised by manufacturer, brand, and model.

Conventional energy rating systems often rely on testing performed at a manufacturer or independent government agency. Due to variances in manufacturing methods and conditions, the energy efficiencies of electrical devices and systems often change, making the static testing of products less accurate. The present invention in a preferred form advantageously permits dynamic energy ratings of electrical apparatuses and systems. For example, as the energy metrics for a given electrical apparatus or system is received by service platform 500 from one or more networks 600 or smartphones (via the Product App), service platform 500 is preferably configured to dynamically update (calculate) and maintain ratings information such as energy efficiency ratings and average power consumption costs for each electrical apparatus and system being tracked. This information presents a more accurate representation of energy ratings than that offered by conventional systems. The ratings information or data may be used by governments, utilities, and/or manufacturers to promote energy-conscience purchasing of products by offering incentives such as rebates. Such rebates may be tiered based on the particular rating, which may be, for example only, a numerical (e.g., 1 to 5) or symbolic (zero to five star) rating. Other variations are possible and within the scope of the present invention.

Service platform 500 may preferably analyze the data from the Product App running on smartphone 10 and/or electricity management unit 300, and deliver to the Product App a comparison showing the differential of alternate tariff(s) supplied by an energy retailer who is an electricity industry participant on the electricity usage and tariff provided by the Product App. Service platform 500, by way of the Product App, may preferably be authorized to make an offer on behalf of an energy retailer in the electricity market for the recipient to transfer their electricity billing to the energy retailer making the offer on the terms of the offer. A recipient of an offer could accept that offer through the Product App, the acceptance of which would be relayed to the appropriate energy retailer in the electricity market by service platform 500.

Any data processing performed by service platform 500 may preferably limit the data used to a group within a pre-defined geographical location.

Service platform 500 is preferably configured to manage or limit communication pathways based on the geographic location of smartphone 10 and/or access administrator 200 and/or electricity management unit 300 and/or market operator 18 and/or electricity industry participant 20.

Referring again to FIG. 4, it will be appreciated that access administrator 200 may operate as a communication gateway allowing a smartphone to operate as a control and/or programming interface in a power line communications network and/or Zigbee® wireless network with at least one electricity management unit 300 and one or more power control units 700. Examples of power control units are described in aforementioned International Application Nos. PCT/AU2011/001666 and PCT/AU2012/000959.

The power line communications and/or Zigbee® wireless communications supported by access administrator 200 and electricity management unit 300 is preferably configured to allow networking with a power control unit 700 capable of regulating the supply of electricity to one or more devices and/or circuits, or may be integrated into an electrical apparatus.

The Product App running on smartphone 10 preferably uses access administrator 200 to load any security or networking credentials necessary for power control unit 700 to join a secure power line communications network and/or Zigbee® wireless communications network between access administrator 200 and electricity management unit 300, although the authoring of a power control unit 700 is not so limited and may make use of any mechanism or methodology available in the chosen power line communications and/or Zigbee® wireless protocols and specifications for joining a network. By way of example, a human interface such as a switch, button or touch pad on a power control unit 700 and/or access administrator 200 and/or electricity management unit 300 could be used to initiate a pairing mode to load any security or networking credentials required for power control unit 700 to join a secure power line communications network and/or Zigbee® wireless communications network between access administrator 200 and electricity management unit 300, the methods of which would be understood by those skilled in the art.

The Product App preferably allows the user to give a unique name to any power control unit 700 making it easy to identify, such as, for example, "pool filter".

The Product App, through access administrator 200, is preferably configured to allow a user to program or control a power control unit 700 directly using power line communications or Zigbee® wireless communications 422. In another preferred embodiment, the Product App through access administrator 200 may be configured to allow a user to program or control a power control unit 700 using power line communications or Zigbee® wireless communications 424 through electricity management unit 300 as an intermediary or network administrator. In another preferred embodiment, power line communications or Zigbee® wireless communications 422, power line communications or Zigbee® wireless communications 424, access administrator 200 and electricity management unit 300 may preferably be configured to support a mesh communications network.

Referring to FIGS. 2 and 4, system microcontroller 208 is preferably configured by the Product App to issue commands to power control unit 700, causing it to vary the supply of electricity to one or more devices and/or circuits based at least in part on instructions communicated from a smartphone. Where system microcontroller 208 includes a perpetual clock calendar, or access administrator 200 includes perpetual clock calendar 204, or access administrator can determine clock information from a wireless or powerline network, system microcontroller 208 is preferably configured by the Product App to issue commands to a power control unit 700 based on a pre-configured schedule. In that way a user could schedule the supply of electricity to one or more devices and/or circuits, the commands being generated by system microcontroller 208 without needing a communications link with smartphone 10.

Referring to FIG. 4, system 400 is preferably configured to permit automatic and/or manual selective variance of power to individual electrical devices and/or systems by one or more of the smartphone user, service platform, and/or electricity industry participant. For example, individual electrical devices and/or systems may be controlled by a power control unit according to a command or schedule implemented through the Product App resident on a user's smartphone. There may be times when it is necessary or preferable to vary or interrupt the schedule due to a triggering event. A trigger may include, but is not limited to, variation of a tariff or the receipt of a demand response command, threshold, flag, notification, or data packet.

In an example where the triggering event is a tariff change, either service platform 500 or electricity industry participant 20 may issue a notification to network 600 of a change in tariff. In response thereto, access administrator 200 and/or electrical management unit 300 may issue appropriate commands to one or more power control units 700 to vary power, shut off power, or where there is a programmed schedule, delay or reset the schedule. For example, if the tariff unexpectedly will increase, service platform 500 will issue a notification to all networks 600 associated with service platform 500 of the change in tariff. A recipient network 600 receives the notification at access administrator 200 via one of the aforementioned communication methods and proceeds to issue commands to one or more power control units 700 to change the power to the electrical device or system being controlled by the power control unit. Preferably, the power control units are grouped into "essential" and "non-essential" units. Examples of essential units include certain lighting systems and appliances such as refrigeration, medical and life support systems. Examples of non-essential units include pool filtration systems and air conditioning. Preferably, access administrator 200 will issue commands to power control units designated as non-essential to vary or shut off power, or if the power control unit is operating according to a schedule, delay or re-schedule.

An example of rescheduling a power control unit is where a power control unit 700 controls power to a pool filtration system operating on a programmed schedule. The receipt of a notification of a tariff change by access administrator 200 causes access administrator 200 to send a command to the power control unit controlling the pool filtration system to delay starting a filtration cycle until the tariff is changed to a lower tariff, or rescheduling a pool filtration cycle until a more favourable tariff condition exists. The delaying or rescheduling of a power control unit may be applicable to other devices and systems as desired, for example, air conditioning, heating, lighting, and/or water sprinkler systems.

The designation of "essential" and "non-essential" is preferably made via the Product App according to the user's preferences. It will be appreciated that the Product App may include default designations as appropriate, which may be changed by the user. Alternatively, each power control unit may be pre-configured with a designation which may be modifiable or permanent (i.e., not modifiable).

System 400 is preferably configured so that a user controlling a network 600 may elect to include their associated system 600 as a participant for triggering event notifications and responses.

In an example of where the triggering event is a demand response, service platform 500 and/or electricity participant 20 may issue the demand response to network 600 to vary or shut off power in a manner similar to that described above for a tariff change. A demand response may be issued, for example, when power demand is approaching a critical level, or when the power grid is being strained in a geographical area as measured by power demand and power available. A demand response may be issued according to predictive modelling, for example, if the weather is predicted to be extreme, causing a spike in energy consumption. Upon receipt of a demand response, network 600 may operate in a manner similar to that described above for receipt of a notification of a tariff change. System 400 may be configured so that in an emergency situation, a demand response may be issued to override any designations in network 600, for example, shutting off or reducing power to all devices or systems serviced within network 600.

Figure 4A:
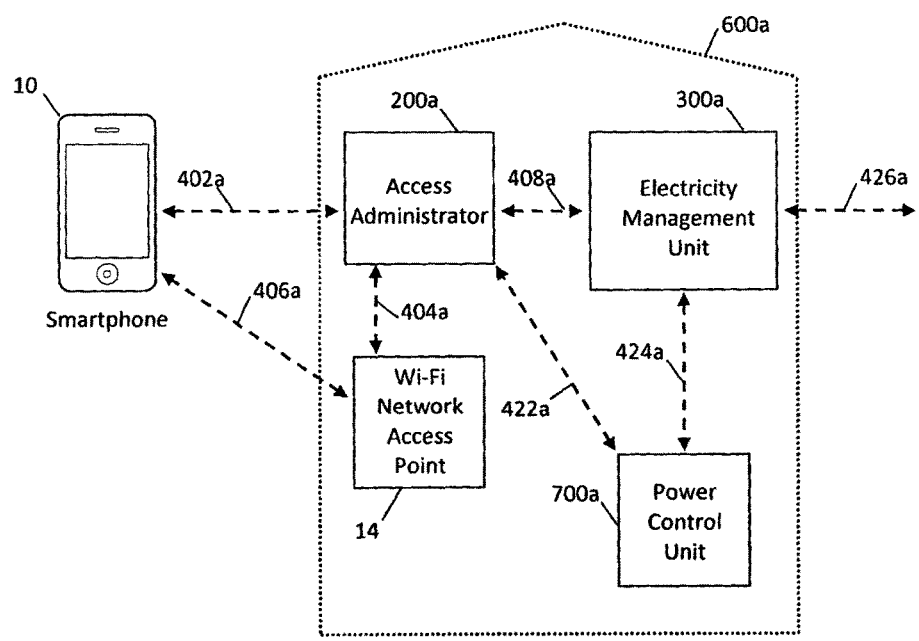
FIG. 4A is a pictorial representation of a local power management network in accordance with another preferred embodiment of the present invention.

Referring now to FIG. 4A, a local power management network 600*a* is shown in accordance with another preferred embodiment of the present invention. Network 600*a* is similar to network 600 except that electricity management unit 300*a* is configured to accept a demand response trigger from electricity industry participant 20 directly (e.g., without service platform 500) via communication pathway 426*a*. Communication pathway 426*a* could be by way of the internet, wireless, satellite, telephone or a direct line, as long as data can be exchanged between an electricity industry participant 20 and electricity management unit 300*a* through a medium and in a format that the recipient can interpret and use. In this situation, a user through the Product App using access administrator 200*a* communicating through wireless peer-to-peer connection 402*a* or WLAN connection 406*a* and WLAN connection 404*a* with access point 14, may configure a power control unit 700*a* directly through power line communications or Zigbee® wireless communications 422*a*, or indirectly via a mesh network using power line communications or Zigbee® wireless communications 408*a* and power line communications or Zigbee® wireless communications 424*a*, with the action to be taken by power control unit 700*a* in response to a demand response trigger broadcast by the electricity industry participant through electricity management unit 300*a* and over a power line communications network or Zigbee® wireless communications network to power control unit 700*a*. For example, access administrator 200*a* may be utilised to configure power control unit 700*a* as essential or non-essential, so that when power control unit 700*a* receives a demand response trigger from electricity management unit 300*a*, power control unit 700*a* will either react to the trigger if the power control unit has been designated as non-essential, or ignore the demand response trigger if the power control unit has been designated as essential.

Figure 4B:
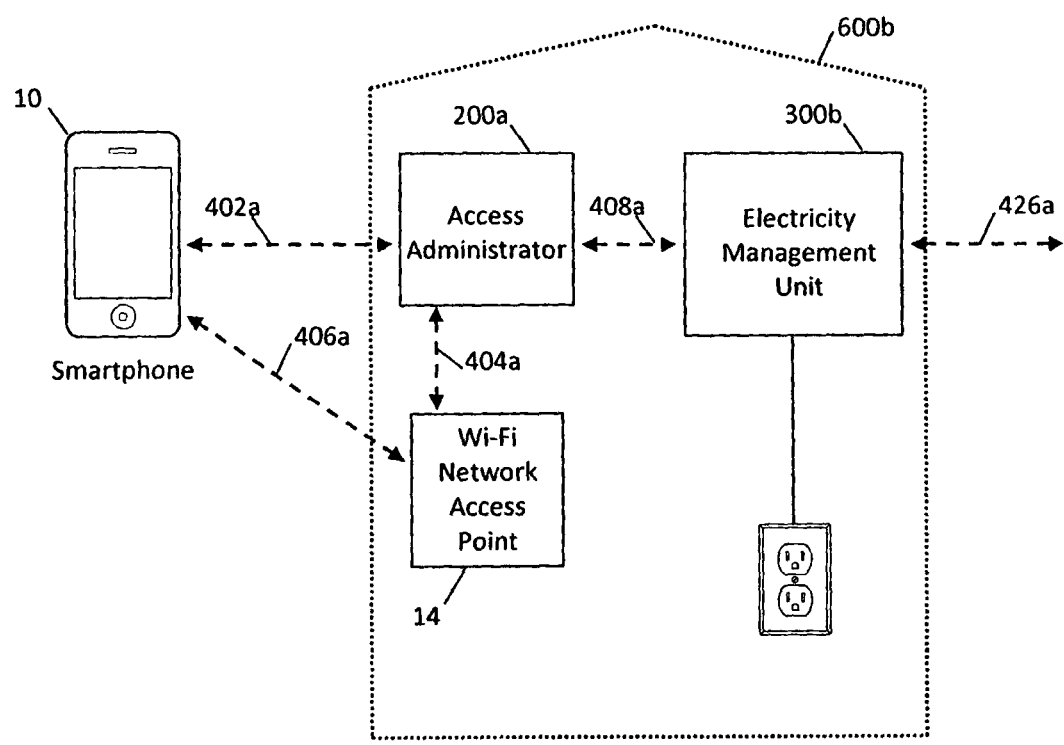
FIG. 4B is a pictorial representation of a local power management network in accordance with a further preferred embodiment of the present invention.

Referring now to FIG. 4B, a local power management network 600*b* is shown in accordance with another preferred embodiment of the present invention. Network 600*b* is similar to network 600*a* except that electricity management unit 300*b* is configured to identify and selectively vary power to circuits to which electricity management unit 300*b* is wired. In this arrangement, a power control unit is not needed for each electrical device or system since electricity management unit 300*b* is configured to perform the functions of the power control unit.

Figure 4C:
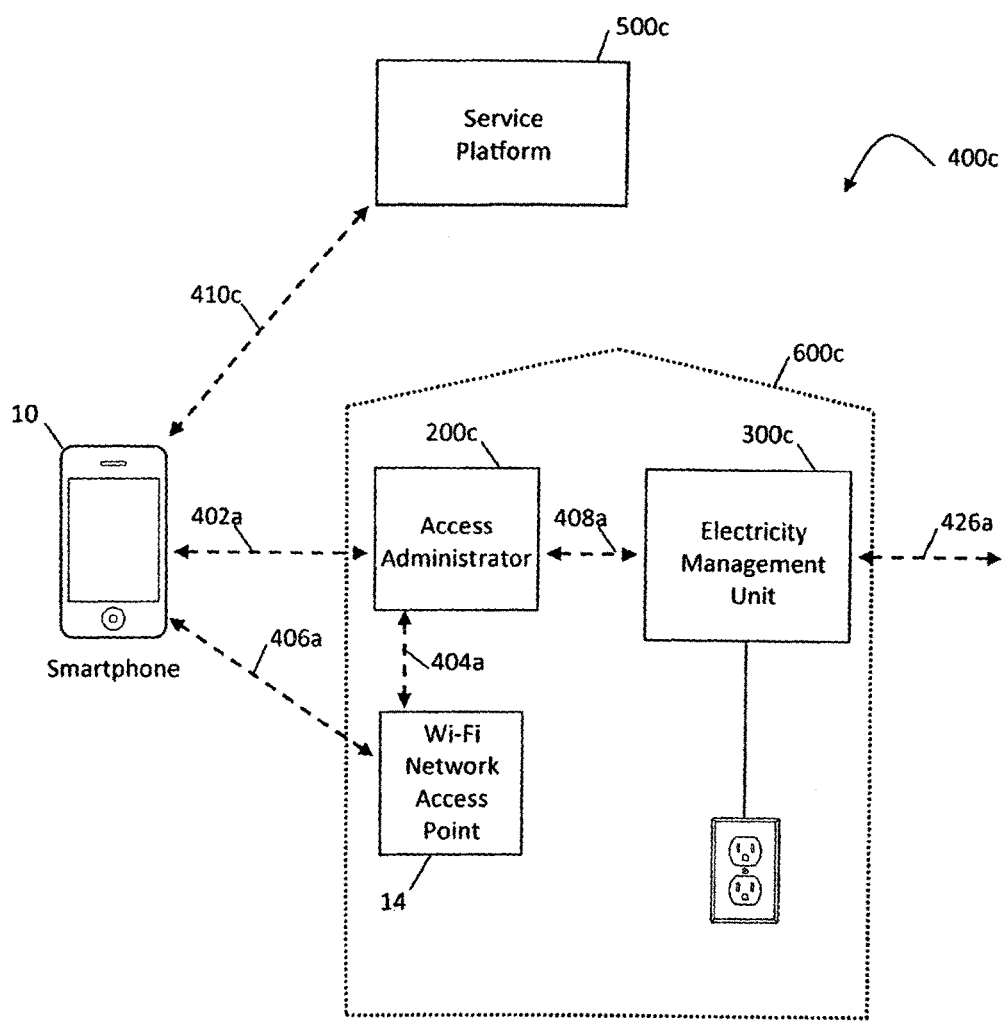
FIG. 4C is a pictorial representation of a local power management network in accordance with an additional preferred embodiment of the present invention.

Referring now to FIG. 4C, a system 400*c* for selectively reducing load across a local power network 600*c* is shown in accordance with another preferred embodiment of the present invention. System 400*c* is similar to system 400 except that, like network 600*b* in FIG. 4B, network 600*c* includes an electricity management unit 300*c* which is preferably configured to identify and selectively vary power to circuits to which electricity management unit 300*c* is wired. Additionally, service platform 500*c* is preferably configured to send, using cellular connection 410c and/or an internet connection, an alert of a change in tariff or strain condition of a local portion of the power grid associated with local power management network 600c to a personal controller 10 associated with local power management network 600c. A user then has an option to use the personal controller to send a command to access administrator 200c to vary power to an electrical device or system through electricity management unit 300c in response to the alert. The command sent to access administrator 200c may be to vary power to non-essential circuits associated with electrical devices and/or systems designated as non-essential. It will be appreciated that instead of electricity management unit 300c being used to vary power to particular circuits, local power management network 600c may be configured with one or more power control units similar to the embodiments illustrated in FIGS. 4 and 4A and described above. System 400c may also be used where electricity management unit 300c has no ability to identify and selectively vary power to circuits, the user instead choosing to manually reduce load by the turning power off to electrical devices, systems or circuits after receiving a notification from service platform 500c.

Continuing with reference to FIG. 4, in a preferred embodiment, power control unit 700 is preferably configured with WLAN capabilities and operates as a client of access point 14 instead of utilizing power line communication or Zigbee® wireless communication technologies. The Product App running on smartphone 10 preferably communicates with power control unit 700 through either wireless peer-to-peer connection 402 with access administrator 200 to WLAN connection 404 with access point 14, or through smartphone 10, and WLAN connection 406 with Wi-Fi network access point 14. It will be appreciated that data exchange between electricity management unit 300 and power control unit 700 may be facilitated by access administrator 200 connected to Wi-Fi access point 14.

The foregoing description is by way of example only, and may be varied considerably without departing from the scope of the present invention. For example, service platform 500 could be wholly or partly integrated inside market operator 18, a party in electricity industry participant 20, or another third party. In another preferred embodiment, the access administrator may be completely integrated into an electricity management unit or other products. In such an embodiment, the smartphone may have a resident Product App that performs substantially as described above, and be connected with a cord to the mains power, for example, via the smartphone charging unit. As described above, the electricity management unit may include a processor which is configured to identify individual power circuits and vary power to those circuits. Where the electricity management unit is so configured, the use of one or more power control units is optional. The electricity management unit may include a communications module configured for wireless or wired communication with an electricity industry participant so as to receive an event trigger directly from the electricity industry participant (e.g., not through the personal controller or service platform).

Figure 5:
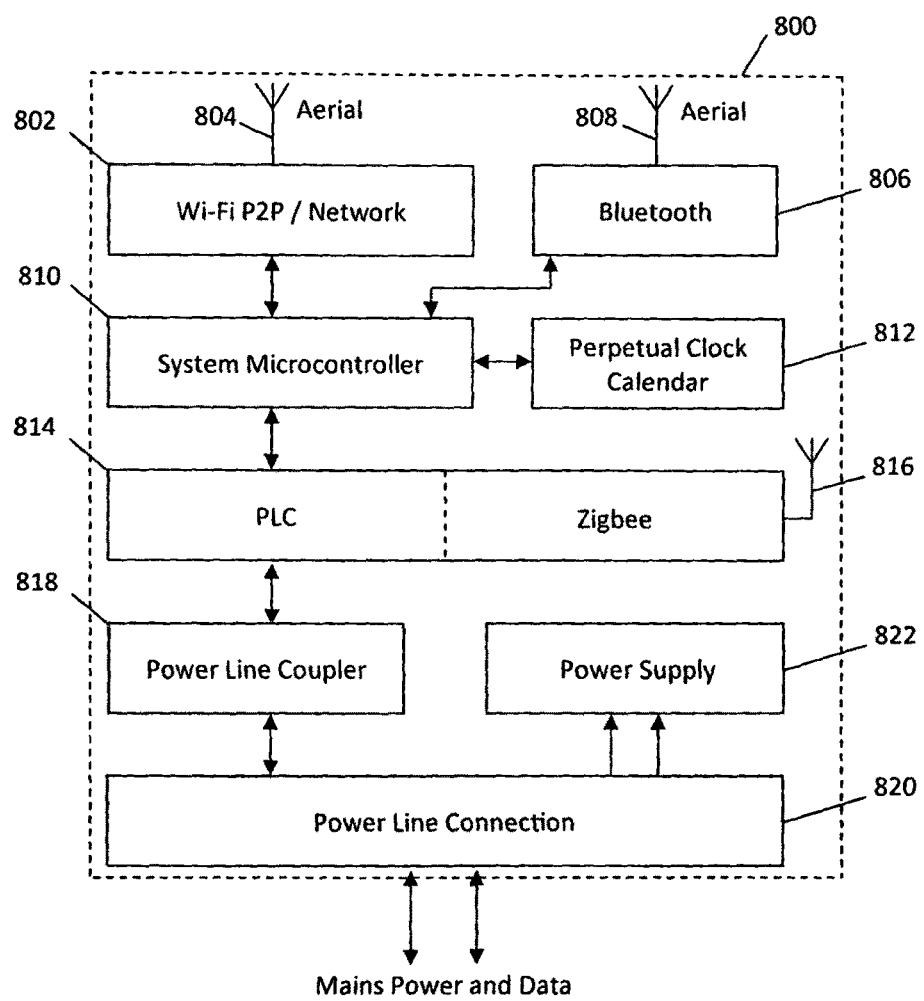
FIG. 5 is a block diagram of the functional elements of an access administrator in accordance with another preferred embodiment of the present invention.

FIG. 5 shows an access administrator 800 in accordance with another preferred embodiment of the present invention. Access administrator 800 provides an example of an alternate configuration of the systems of access administrator 200. Access administrator 800 preferably includes Wi-Fi communications 802, Wi-Fi aerial 804, Bluetooth® communications 806, Bluetooth® aerial 808, system microcontroller 810 with embedded memory, perpetual clock calendar 812, electricity management unit communications 814, electricity management unit communications aerial 816, power line coupler 818, power line connection 820, and system power supply 822. In some preferred embodiments, it may be preferable for system microcontroller 810 to support external memory in addition to, or instead of, embedded memory. In some preferred embodiments, it may be preferable to aggregate Wi-Fi communications 802 and Bluetooth® communications 806 as a component, SiP or SoC allowing for a single aerial. It will be appreciated by those of ordinary skill in the art that the system described above can be varied in many ways without departing from the scope of the present invention.

Aspects of the present invention may be used in a variety of environments. For example only, the invention can be adapted for use with gas meters (e.g., natural gas) and water meters, as well as electricity meters for use with home-generated electrical apparatuses such as a PV solar system and/or wind turbine.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A device for linking a personal controller to a smartmeter, the personal controller having a processor, a user interface, and a wireless communications transceiver, the smartmeter being configured to at least measure power flow, said device comprising:

a wireless communications module operable for wireless communication with the personal controller, said wireless communications module including an aerial and a radio transceiver, said wireless communications module being configured to communicate wirelessly with the personal controller in at least two different modes, a first of the modes being a peer-to-peer communications mode, a second of the modes being a non-peer-to-peer communication mode;

a local network communications module operable for communication with the smartmeter, said local network communications module being configured to communicate with the smartmeter using an IEEE 802.15 series communications standard;

an interface connection for physically connecting said device to a mains power line, said interface connection being configured for plug and socket engagement with a mains power outlet; and a microcontroller configured to access, through said local network communications module, the smartmeter based at least in part on instructions communicated from the personal controller through said wireless communications module, said microcontroller being configured to relay data measured by the smartmeter from the smartmeter to the personal controller using said local network communications module and said wireless communications module, said microcontroller being configured to change from the first mode to the second mode upon wirelessly receiving instructions from the personal controller for said radio transceiver to operate in the second mode.

2. The device of claim 1, wherein said local network communications module is configured to communicate with the smartmeter using only an IEEE 802.15 series communications standard.

3. The device of claim 1, wherein said local network communications module is configured to communicate with the smartmeter using Zigbee.

4. The device of claim 1, wherein said microcontroller is configured to relay data stored by the smartmeter from the smartmeter to the personal controller using said local network communications module and said wireless communications module.

5. The device of claim 1, wherein said microcontroller is configured to open a peer-to-peer wireless communication link with the personal controller using a SoftAP.

6. The device of claim 1, wherein said microcontroller is configured to relay instantaneous power measured by the smartmeter from the smartmeter to the personal controller.

* * * * *